US011646661B2

(12) United States Patent
Ruan et al.

(10) Patent No.: US 11,646,661 B2
(45) Date of Patent: May 9, 2023

(54) VOLTAGE CONVERTER WITH LOOP CONTROL

(71) Applicant: Texas Instruments Incorporated, Dallas, TX (US)

(72) Inventors: Jiancong Ruan, Shenzhen (CN); Runqin Tan, Shenzhen (CN); Wenkai Chen, Shenzhen (CN); Biao Chen, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 40 days.

(21) Appl. No.: 17/237,950

(22) Filed: Apr. 22, 2021

(65) Prior Publication Data

US 2021/0359602 A1     Nov. 18, 2021

Related U.S. Application Data

(60) Provisional application No. 63/025,594, filed on May 15, 2020.

(51) Int. Cl.
| | |
|---|---|
| *H02M 3/157* | (2006.01) |
| *H02M 1/08* | (2006.01) |
| *H02M 3/158* | (2006.01) |
| *H02M 1/00* | (2006.01) |
| *H02M 3/156* | (2006.01) |

(52) U.S. Cl.
CPC ......... *H02M 3/157* (2013.01); *H02M 1/0025* (2021.05); *H02M 1/08* (2013.01); *H02M 3/158* (2013.01); *H02M 3/156* (2013.01)

(58) Field of Classification Search
CPC ............. H02M 1/0003; H02M 1/0006; H02M 1/0009; H02M 1/0025; H02M 1/08; H02M 3/156; H02M 3/157; H02M 3/158
See application file for complete search history.

(56) References Cited

U.S. PATENT DOCUMENTS

| | | | |
|---|---|---|---|
| 10,727,734 B2 * | 7/2020 | Gritti | H02M 3/156 |
| 2014/0300336 A1 * | 10/2014 | Li | H02M 3/156 323/285 |
| 2015/0338866 A1 * | 11/2015 | Hu | G05F 1/575 323/280 |
| 2019/0115835 A1 * | 4/2019 | Cohen | H02M 3/157 |

FOREIGN PATENT DOCUMENTS

| | | | | |
|---|---|---|---|---|
| CN | 203278651 | * | 11/2013 | ............ H02M 3/157 |
| EP | 3534517 A1 | * | 9/2019 | ............. H02M 1/08 |

* cited by examiner

*Primary Examiner* — Matthew V Nguyen
(74) *Attorney, Agent, or Firm* — Ray A. King; Frank D. Cimino

(57) ABSTRACT

A voltage converter system includes a switch configured to operate in first and second states. Compensation circuitry is configured to provide: a certain reference voltage as a reference voltage when the switch has the second state; and a compensated reference voltage as the reference voltage when the switch has the first state. Control circuitry is configured to switch the switch between the first and second states based on the reference voltage and a feedback voltage generated based on an output voltage of the voltage converter system.

18 Claims, 8 Drawing Sheets

US 11,646,661 B2

VOLTAGE CONVERTER WITH LOOP CONTROL

CROSS-REFERENCE TO RELATED APPLICATION

This application claims priority to U.S. Provisional Patent Application No. 63/025,594 filed May 15, 2020, which is incorporated herein by reference.

TECHNICAL FIELD

This description relates generally to integrated circuits, and more particularly to a voltage converter system with loop control.

BACKGROUND

Voltage converters are useful to convert an input DC voltage to a desired output DC voltage to drive a load. A voltage converter may include a feedback loop that determines on or off time of a switch in each switching cycle based on a feedback voltage and a reference voltage, thereby regulating an output voltage of the voltage converter. In a conventional current mode voltage converter, a pulse-width-modulation (PWM) signal that controls the switch is regulated based on the feedback voltage and a reference voltage.

SUMMARY

A voltage converter system includes a switch configured to operate in first and second states. Compensation circuitry is configured to provide: a certain reference voltage as a reference voltage when the switch has the second state; and a compensated reference voltage as the reference voltage when the switch has the first state. Control circuitry is configured to switch the switch between the first and second states based on the reference voltage and a feedback voltage generated based on an output voltage of the voltage converter system.

DETAILED DESCRIPTION

This description relates to voltage converter systems with loop control.

Figure 1:
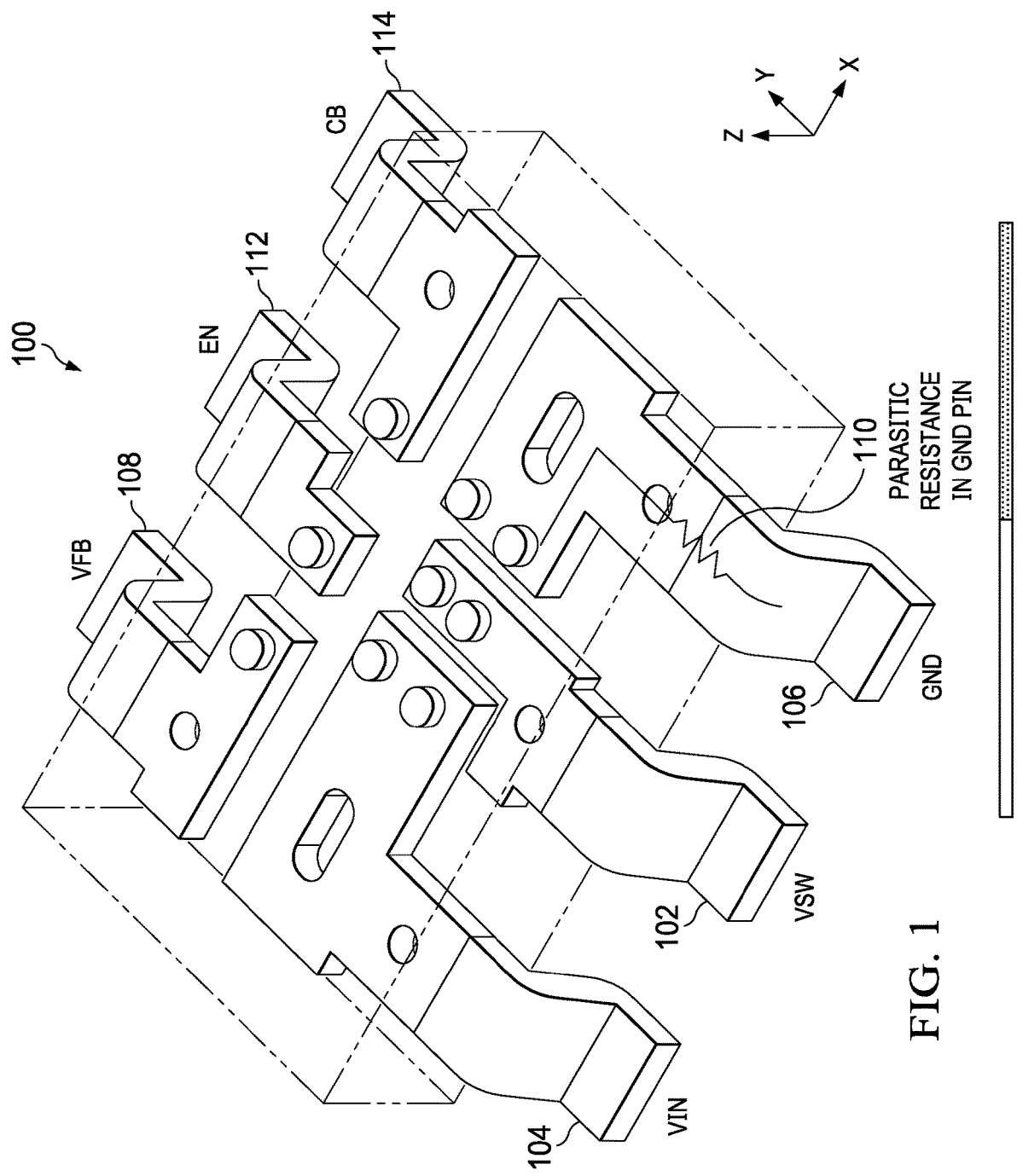
FIG. 1 is an isometric perspective view of an integrated circuit package suitable for use in a voltage converter system in accordance with this description.

FIG. 1 shows an isometric perspective view of an integrated circuit package 100 suitable for use in a voltage converter system in accordance with this description. The integrated circuit package 100 includes a switching terminal 102 for coupling a high-side transistor (not shown) and a low-side transistor (not shown) to an output inductor (not shown) of an output circuit (not shown) of the voltage converter system. The high-side transistor and low side transistor are coupled in series between a voltage input terminal 104 and a voltage supply terminal 106 (such as a ground terminal GND) of the integrated circuit package 100, and joined at the switching terminal 102. The voltage input terminal 104 is configured to receive an input voltage VIN of the voltage converter system. The output circuit can be coupled to the switching terminal 102 for generating an output voltage VOUT of the voltage converter system based on a switching signal VSW at the switching terminal 102. The voltage converter system also includes a feedback terminal 108 configured to receive a feedback voltage VFB based on the output voltage VOUT. The voltage converter system includes loop control circuitry. During operation, the loop control circuitry generates a switch control signal to switch the high-side transistor and low side transistor on and off, in order to generate the switching signal VSW at the switching terminal 102. In one example, a ripple voltage that is generated based on the switching signal VSW is provided at the feedback terminal 108. The switch control signal is generated based on a difference between a reference voltage VREF and the feedback voltage VFB. The integrated circuit package 100 also includes an enable terminal 112 configured to receive an enable signal EN, and a boost terminal 114 adapted to be coupled to a boost capacitor CB to supply the high side transistor.

With the development of power process technology, current density of small sized package is increasing. Small sized packages are preferred to have fewer input/output (I/O) terminals. To reduce the number of I/O terminals, an internal analog ground terminal AGND and a power ground PGND are combined as the ground terminal GND 106 of the integrated circuit package 100. However, a small sized package and poor PCB routing introduce parasitic resistance 110, such as shown in the pin of the ground terminal GND 106 of the integrated circuit package 100, which causes poor load regulation especially in a voltage converter system having a relatively high output current and a relatively low reference voltage.

Figure 2:
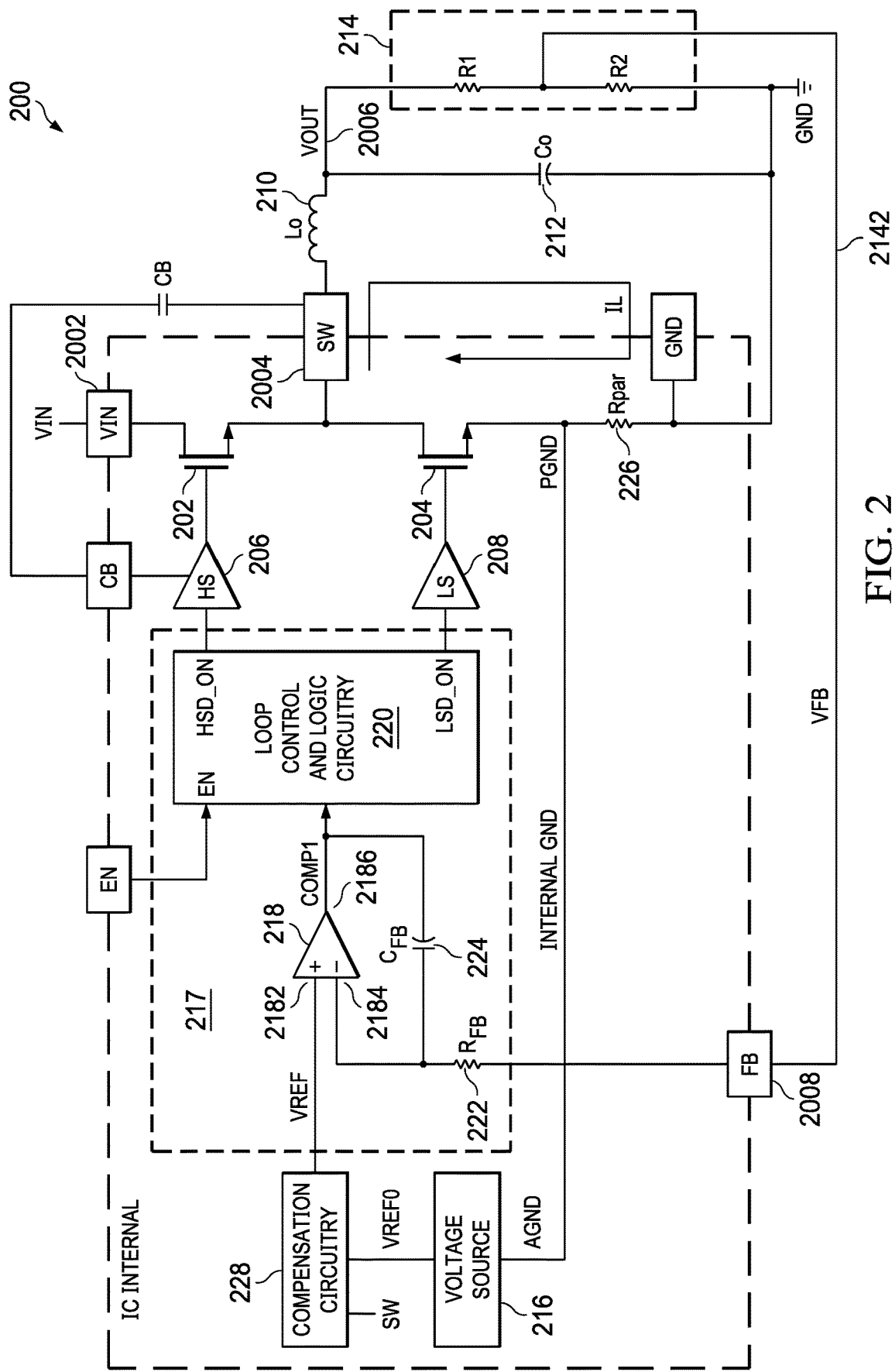
FIG. 2 is a block diagram of the voltage converter system of FIG. 1 in accordance with an implementation of this description.

FIG. 2 is a block diagram of a voltage converter system 200 in an implementation of this description. The voltage converter system 200 is configured to convert an input voltage VIN to an output voltage VOUT at a target voltage level.

The system 200 includes: (a) a first switch 202 having a first terminal (such as a drain terminal) coupled to a voltage input terminal 2002 that receives the input voltage VIN of the system 200, a second terminal (such as a source terminal) coupled to a switching terminal SW 2004, and a control terminal (such as a gate terminal); and (b) a second switch 204 having a first terminal (such as a drain terminal) coupled to the switching terminal 2004, a second terminal (such as a source terminal) coupled to a voltage supply terminal (such as a power ground terminal PGND), and a control terminal (such as a gate terminal). Accordingly, the system allows: (a) a current flowing from the voltage input terminal 2002 to the switching terminal 2004 when the first switch 202 has a first state (such as an on state) and the second switch 204 has a second state (such as an off state); and (b) a current flowing from the power ground terminal PGND to the switching terminal 2004 when the first switch 202 is off, and the second switch 204 is on. The first and second switches 202 and 204, also named respectively as high side and low side switches, can be transistors, such as metal oxide semiconductor field effect transistors (MOSFETs), which are respectively controlled by gate drive signals HSD_ON and LSD_ON provided through first and second gate drivers 206 and 208 to the gate terminals of the first and second switches 202 and 204, to alternately operate the first and second switches 202 and 204 in the first and second states. The system 200 also includes: (a) an output inductor 210 coupled between the switching terminal 2004 and a voltage output terminal 2006, the output inductor 210 having inductance of Lo; and (b) an output capacitor 212 coupled between the output voltage terminal 2006 and a ground terminal GND, the output capacitor 212 having capacitance of Co.

The system 200 includes feedback circuitry 214 having a voltage divider coupled between the output terminal 2006 and the ground terminal GND, the voltage divider having a voltage divider output 2142 coupled to a feedback terminal 2008 of the system 200. The feedback circuitry 214 is configured to generate a feedback voltage VFB proportional to the output voltage VOUT.

The system 200 also includes a voltage source 216 configured to generate a certain reference voltage VFEF0 based on a bandgap voltage. In one example, the certain reference voltage is an ideal reference voltage for the system 200 determined based on the target voltage level of the output voltage VOUT of the system 200. The bandgap voltage is generated with reference to an internal analog ground terminal AGND of the system 200.

The system 200 includes control circuitry 217 configured to control the first and second switches 202 and 204 based on the feedback voltage VFB and a reference voltage VREF. The control circuitry 217 includes an amplifier 218 having a first amplifier input 2182 (such as a non-inverting input) coupled to the voltage source 216, a second amplifier input 2184 (such as an inverting input) coupled to the feedback terminal 2008, and an amplifier output 2186. The amplifier 218 is configured to generate an amplifier output signal COMP1 at the amplifier output 2186 based on a difference between the reference voltage VREF and the feedback voltage VFB. The control circuitry 217 also includes loop control and logic circuitry 220 coupled to the amplifier output 2186, and configured to generate the gate drive signals HSD_ON and LSD_ON. In one example, the loop control and logic circuitry 220 generates the gate drive signals HSD_ON and LSD_ON based on the amplifier output signal COMP1. In another example, the gate drive signals HSD_ON and LSD_ON are generated based on a combination of the amplifier output signal COMP1 and a ripple voltage (not shown), which is generated based on the switching signal VSW at the switching terminal 2004. In one example, the ripple voltage may be generated by the loop control and logic circuitry 220 and combined with the amplifier output signal COMP1. In another example, the ripple voltage may be generated by the loop control and logic circuitry 220 and combined with the feedback voltage VFB, and a combination of the feedback voltage VFB and the ripple voltage is combined with the reference voltage VREF to generate the amplifier output signal COMP1. In one example, the control circuitry 217 includes a feedback resistor $R_{FB}$ 222 coupled between the feedback terminal 2008 and the second amplifier input 2184, and a feedback capacitor $C_{FB}$ 224 coupled between the second amplifier input 2184 and the amplifier output 2186. The amplifier output signal COMP1 is an integral value of a difference between the reference voltage VREF and the feedback voltage VFB.

Because of a pin count limitation, the power ground PGND and the internal analog ground AGND are combined as the ground pin of the ground terminal GND of the voltage converter system 200. A ground pin parasitic resistor 226 is located between the power ground PGND and the ground terminal GND, the ground pin parasitic resistor 226 having resistance of Rpar. When the second switch 204 is switched on, a load current IL flowing through the second switch 204 causes a voltage drop across the ground pin parasitic resistor 226, thereby pulling down the certain reference voltage VREF0 with reference to the ground terminal GND, which affects the accuracy of the regulation. For example, when the load current IL is increasing, the output voltage VOUT will decrease because of the regulation performed based on a decreased reference voltage VREF0' generated by the voltage source 216, if the decreased reference voltage VREF0' is used as a reference voltage.

To compensate for the difference between the certain reference voltage VREF0 and the decreased reference voltage VREF0', the system 200 includes compensation circuitry 228 coupled between the voltage source 216 and the first amplifier input 2182. The compensation circuitry 228 is configured to: (a) provide the certain reference voltage VREF0 as the reference voltage VREF to the amplifier 218 when the second switch 204 is off; and (b) compensate the decreased reference voltage VREF0' and provide a compensated voltage as the reference voltage VREF to the amplifier 218 when the second switch 204 is on.

Figure 3:
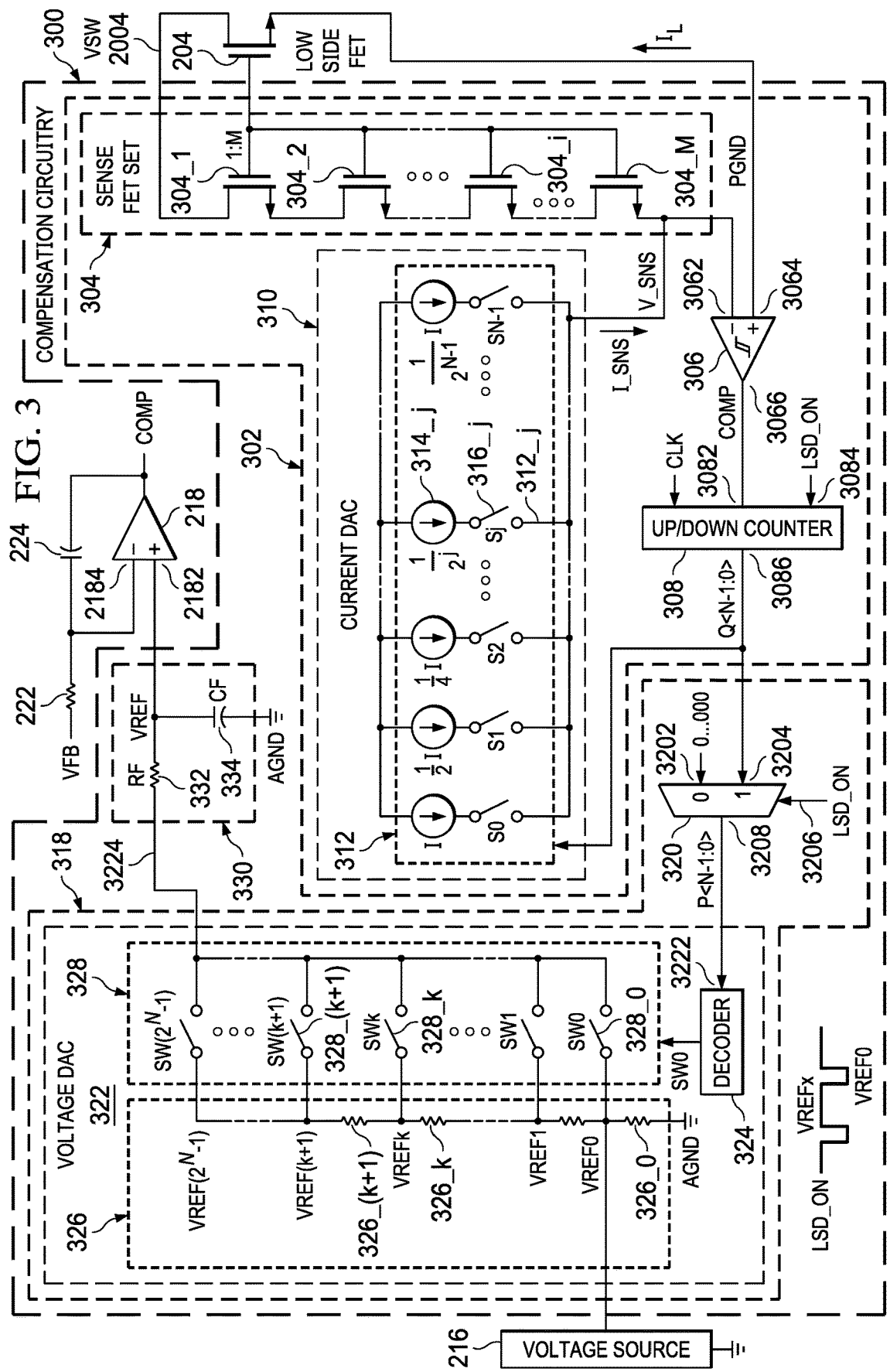
FIG. 3 is a schematic circuit diagram of compensation circuitry of the voltage converter system of FIG. 2.

FIG. 3 shows an example schematic circuit diagram of compensation circuitry 300, such as the compensation circuitry 228 of the voltage converter system 200 of FIG. 2. The compensation circuitry 300 includes sensing circuitry 302 coupled to a switching terminal (such as the switching terminal 2004 of the converter system 200), and configured to generate a sensed signal proportional to a current IL flowing through the second switch 204 when the second switch 204 is on.

The sensing circuitry 302 includes a set of sensing transistors 304, such as M sensing transistors 304_1 through 304_M (M is an integer greater than 0) coupled in series to the switching terminal 2004. Each of the set of sensing transistors 304_i (where i is an integer greater than or equal to 1, and less than or equal to M) includes a first terminal (such as a drain terminal), a second terminal (such as a source terminal), and a control terminal (such as a gate terminal). The set of sensing transistors 304 includes a first sensing transistor 304_1 having a drain terminal coupled to the switching terminal SW, and a last sensing transistor 304_M. The gate terminals of the set of sensing transistors 304 are coupled to the gate terminal of the second switch 204. In one example, the set of sensing transistors 304 can be metal oxide semiconductor field effect transistors (MOSFETs). The set of sensing transistors 304 is configured to generate a sensed voltage V_SNS at the source terminal of the last sensing transistor 304_M.

The sensing circuitry 302 includes a comparator 306 having a first comparator input 3062 (such as an inverting input) coupled to the source terminal of the last sensing transistor 304_M, and a second comparator input 3064 (such as a non-inverting input) coupled to the source terminal of the second switch 204, and a comparator output 3066 configured to provide a comparator output signal COMP. In one example, the comparator 306 is a hysteretic comparator to avoid the comparator output signal COMP toggling when the sensed voltage V_SNS is within a target range, so as to improve the stability of the comparator output signal COMP.

The sensing circuitry 302 includes an up/down counter 308 having a data input 3082 configured to receive the comparator output signal COMP, a control input 3084 configured to receive the gate drive signal LSD_ON of the second switch 204, and a counter output 3086. The up/down counter 308 is configured to generate a count value Q<N-1:0> as the sensed signal at the counter output 3086, where N is an integer greater than 0. The count value Q<N-1:0> is generated based on a difference between the sensed voltage V_SNS and a voltage at the power ground PGND. In one example, when the second switch 204 is on (such as when the gate drive signal LSD_ON is asserted), the up/down counter 308: (a) counts up based on a clock signal CLK when the voltage at the power ground PGND is higher than the sensed voltage V_SNS; and (b) counts down based on the clock signal CLK when the voltage at the power ground PGND is lower than the sensed voltage V_SNS. The up/down counter 308 is configured to latch the count value Q<N-1:0> responsive to the second switch 204 switching from on state to off state (such as responsive to a falling edge of the gate drive signal LSD_ON). The clock signal CLK can be generated internally within the up/down counter 308, or can be provided by an external oscillator.

The sensing circuitry 302 includes a variable current source 310 coupled between the counter output 3086 and the set of sensing transistors 304, and configured to provide a sensed current I_SNS to the set of sensing transistors 304 based on the count value Q<N-1:0>. In one example, the variable current source 310 is a current digital-to-analog converter (DAC) configured to: (a) convert the count value Q<N-1:0> to the sensed current I_SNS; and (b) inject the sensed current I_SNS to the set of sensing transistors 304. In one example, the current DAC includes a set of parallel current paths 312. Each current path 312_j (where j is an integer greater than or equal to 0, and less than N) includes a current source 314_j and a current control switch Sj 316_j configured to couple the current source 314_j to the set of sensing transistors 304. The current control switch 316_j is controlled by a corresponding bit (such as the $j^{th}$ bit from MSB) of the count value Q<N-1:0>, so the sensed current I_SNS is proportional to the count value Q<N-1:0>. In operation, the sensed current I_SNS is adjusted by the up/down counter 308 until the sensed voltage V_SNS is substantially equal to the voltage at the power ground PGND. When the up/down counter 308 becomes stable, the count value Q<N-1:0> is representative of an absolute value of the voltage at the power ground PGND.

The compensation circuitry 300 includes reference voltage generation circuitry 318 coupled to the sensing circuitry 302. The reference voltage generation circuitry 318 includes a multiplexer 320 having a first multiplexer input 3202 configured to receive a certain binary signal, a second multiplexer input 3204 coupled to the counter output 3086 and configured to receive the count value Q<N-1:0>, a selection input 3206 coupled to the loop control and logic circuitry 220 and configured to receive the gate drive signal LSD_ON, and a multiplexer output 3208 configured to provide a multiplexer output signal P<N-1:0> at the multiplexer output 3208. The certain binary signal is an N-bit binary signal. The multiplexer output signal P<N-1:0> is configured to be the certain binary signal when the second switch 204 is off, and to be the count value Q<N-1:0> when the second switch 204 is on.

The reference voltage generation circuitry 318 includes a voltage DAC 322 having a voltage DAC input 3222 coupled to the multiplexer output 3208, and a voltage DAC output 3224 configured to provide the reference voltage VREF to the amplifier 218 of the system 200 of FIG. 2. The voltage DAC 322 includes a decoder 324 configured to convert the multiplexer output signal P<N-1:0> to a $2^N$-bit one-hot signal. The voltage DAC 322 also includes a resistor ladder 326 having a first resistor 326_0 coupled between the voltage source 216 and the internal analog ground terminal AGND, and a set of voltage control switches 328. Each voltage control switch 328_k (where k is an integer greater than or equal to 0, and less than $2^N$) includes: (a) a first terminal coupled to a corresponding tap between two adjacent resistors 326_k and 326_(k+1) of the resistor ladder 326; and (b) a second terminal coupled to the voltage DAC output 3224, which is controlled by a corresponding bit (such as the $k^{th}$ bit from LSB) of the $2^N$-bit one-hot signal output by the decoder 324, so the voltage DAC 322 is configured to generate the reference voltage VREF at the voltage DAC output 3224 based on the multiplexer output signal P<N-1:0>. In one example, the certain binary number is configured to be converted to the one-hot signal to switch on a first voltage control switch 328_0 and switch off the other voltage control switches of the set of voltage control switches 328. Accordingly, when the second switch 204 is off, the voltage DAC 322 outputs the certain reference voltage VREF0 as the reference voltage VREF to the amplifier 218. When the second switch 204 is on, the voltage DAC 322 outputs a compensated reference voltage proportional to the count value Q<N-1:0> as the reference voltage VREF. In one example, the compensation circuitry 300 includes a low pass filer 330 coupled between the voltage DAC output 3224 and the first amplifier input 2182. The low pass filter 330 includes a resistor RF 332 coupled between the voltage DAC output 3224 and the first amplifier input 2182, and a capacitor CF 334 coupled between the first amplifier input 2182 and the internal analog ground terminal AGND.

Figure 4:
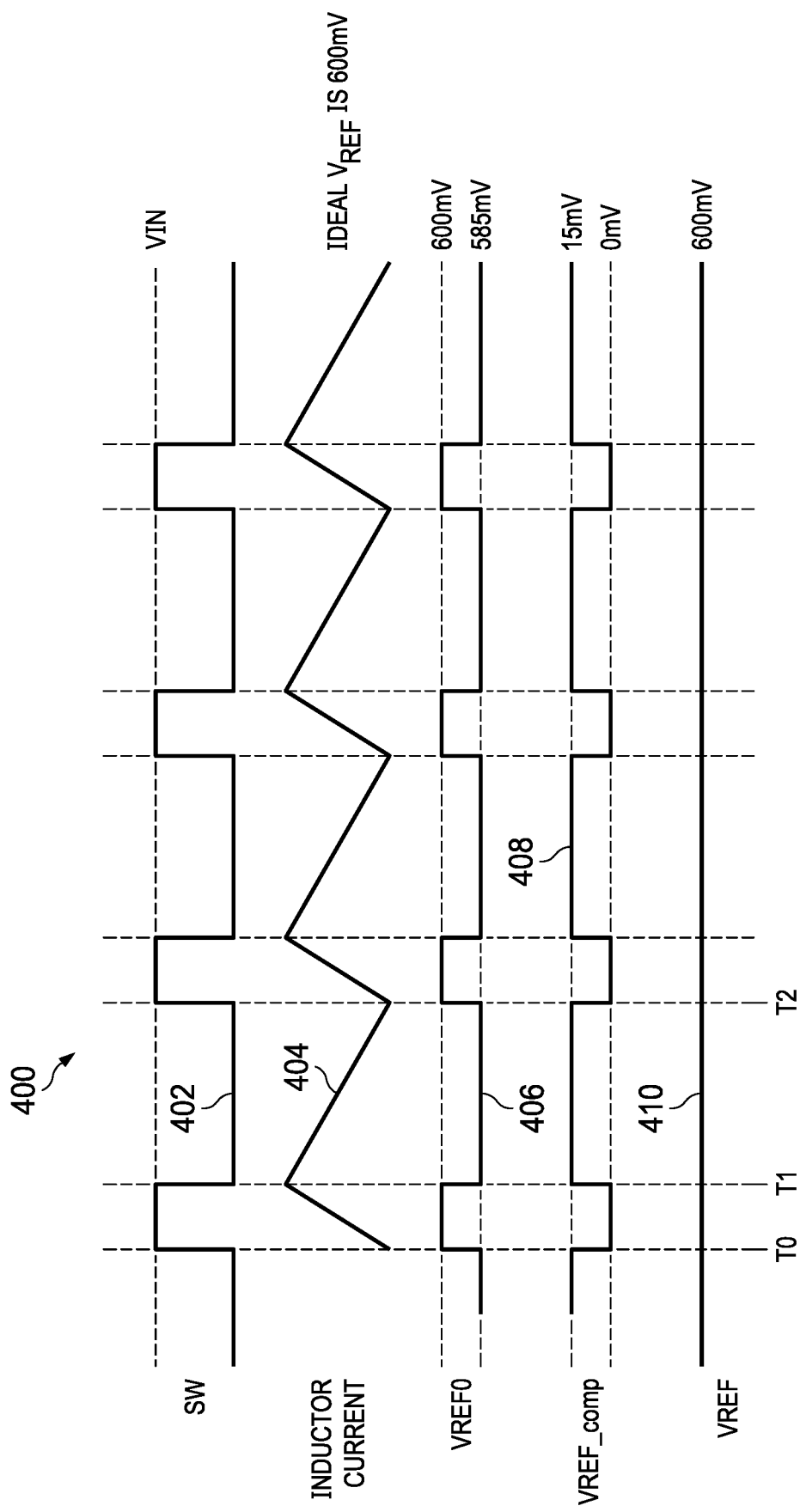
FIG. 4 is a timing diagram of waveforms of the voltage converter system of FIG. 2.

FIG. 4 is a timing diagram of waveforms of the voltage converter system 200 of FIG. 2, with reference to FIG. 3. From T0 to T1, the first switch 202 is switched on and the second switch 204 is switched off, so the voltage VSW 402 at the switching terminal 2004 is switched to the input voltage VIN, and an inductor current 404 through the output inductor 210 ramps up. The certain reference voltage VREF0 406 generated by the voltage source 216 remains at an ideal reference voltage, such as 600 mV with reference to the ground terminal GND. VREF_comp 408 represents a voltage difference between the output of the voltage DAC 322 and the certain reference voltage VREF0 406. From T0 to T1, no voltage is compensated to the certain reference voltage VREF0 406. Therefore, the reference voltage VREF 610 provided to the amplifier 218 is the ideal reference voltage 600 mV.

From T1 to T2, the first switch 202 is switched off and the second switch 204 is switched on, so the voltage VSW 402 at the switching terminal 2004 is switched to the power ground PGND, and the inductor current 404 is decreasing. The certain reference voltage VREF0 406 generated by the voltage source 216 decreases with reference to the ground terminal GND, such as to 585 mV, because of the voltage drop across the ground pin parasitic resistor 226 located between the ground terminal GND and the power ground terminal PGND. The 15 mV voltage drop is sensed by the sensing circuitry 302 and represented by the count value Q<N-1:0>. A corresponding voltage control switch 328_k among the second voltage control switch SW1 328_1 to the last voltage control switch SW($2^N$–1) 328 ($2^N$–1) is selected to open based on the one-hot signal converted from the count value Q<N-1:0>, which causes an increase, such as 15 mV, of VREF_comp 408. Therefore, the reference voltage VREF 610 provided to the amplifier 218 remains at the ideal reference voltage 600 mV. When the second switch 204 is on, VREF_comp 408 is provided in accordance with equation (1):

$$V_{REF\_comp} = \frac{V\_SNS}{R_{ds\_on}} \times R_{par} \quad (1)$$

where $R_{ds\_on}$ is drain-source on resistance of the second switch 204, and $R_{par}$ is the resistance of the ground pin parasitic resistor 226.

Figure 5:
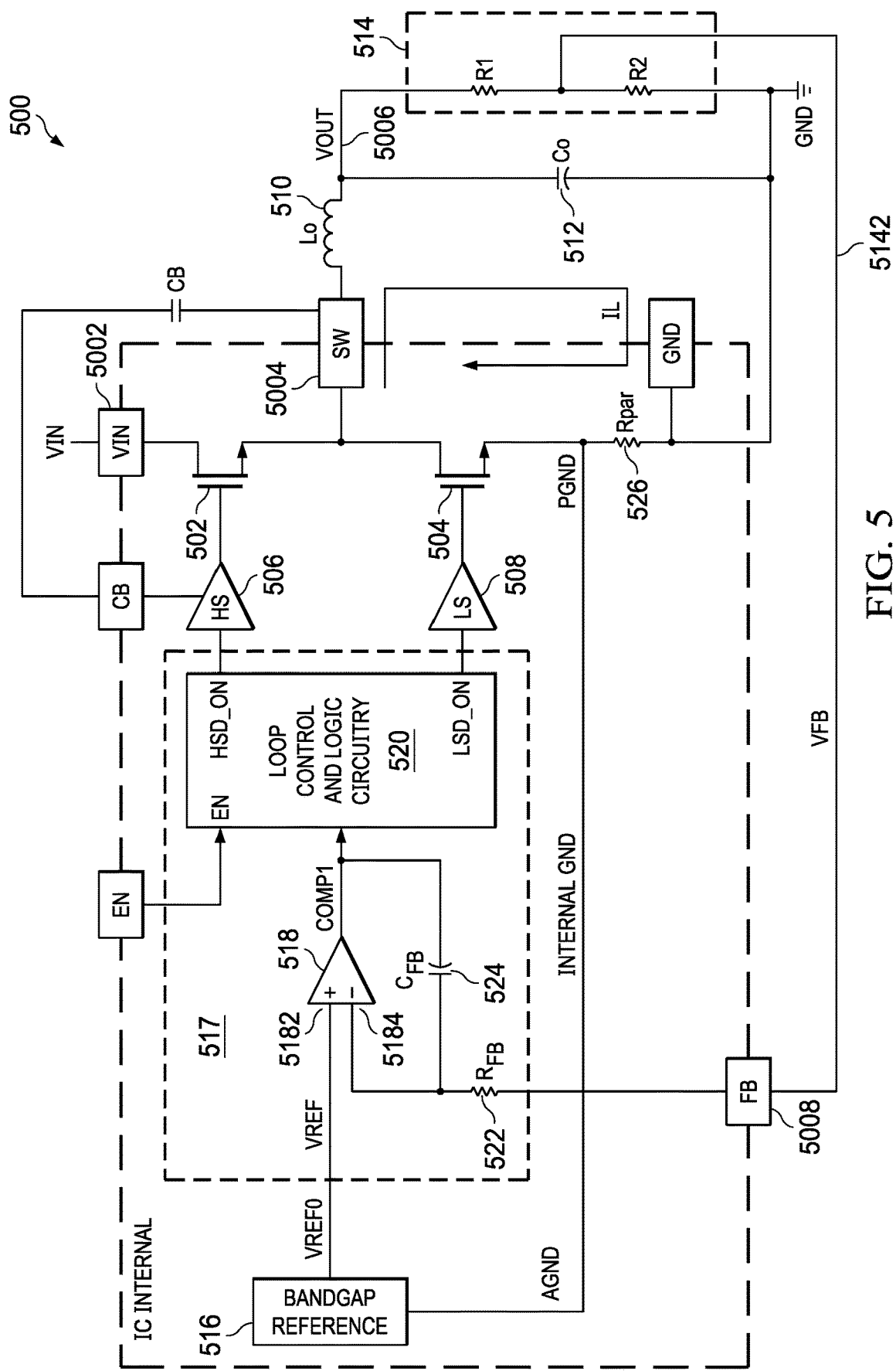
FIG. 5 is a block diagram of a voltage converter system without reference voltage compensation.

FIG. 5 is a block diagram of a voltage converter system 500 without reference voltage compensation. The voltage converter system 500 is substantially similar to the voltage converter system 200, except that the certain reference voltage VREF0 generated by the voltage source 516 is provided to the amplifier 518 as the reference voltage VREF regardless the state of the second switch 204.

The feedback voltage VFB is relative to the ground terminal GND (the PCB ground), but the reference voltage VREF is generated relative to the internal analog ground AGND, which is shared with the power ground terminal PGND. When the inductor current IL flows through the second switch 204, the voltage drop across the ground pin parasitic resistor 526 causes the reference voltage VREF to drop, so an average value of the reference voltage VREF shifts to a lower value.

Load regulation of the converter system 500 is provided in accordance with equation (2):

$$\text{Load Regulation} = \frac{(1-D) \times R_{par} \times I_{out\_Max}}{V_{REF}} \quad (2)$$

where $R_{par}$ is the resistance of the ground pin parasitic resistor 526 between the power ground terminal PGND of the converter system 500 and the ground terminal GND of the converter system 500, D is duty cycle of the converter system 500, $I_{out\_Max}$ is a maximum output current of the converter system 500, and VREF is reference voltage.

Figure 6:
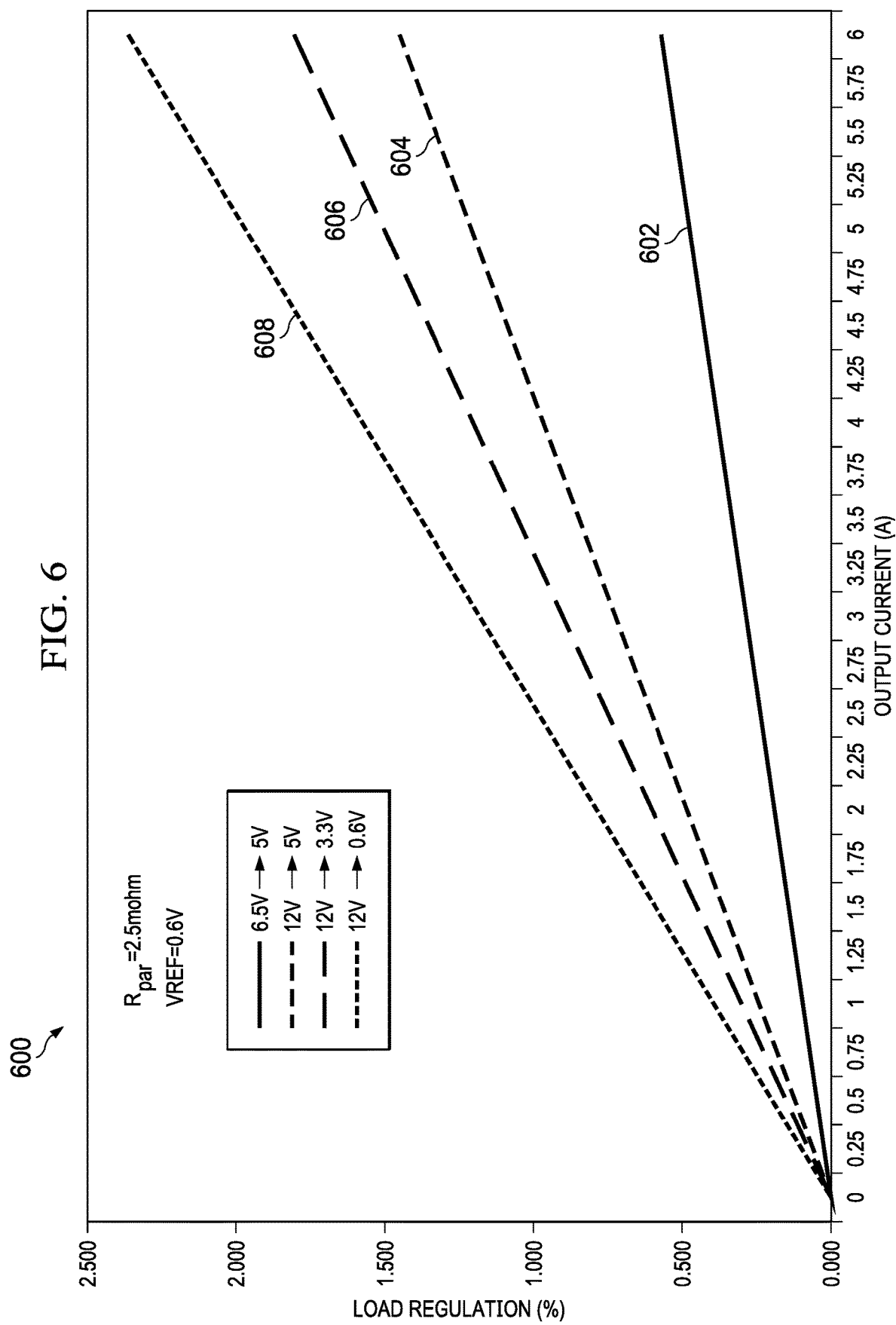
FIG. 6 is a graph of load regulations of the voltage converter system of FIG. 5 operating under different conditions.

FIG. 6 is a graph of load regulations of the voltage converter system of FIG. 5 operating under different conditions of input and output voltages, where the resistance $R_{par}$ of the ground pin parasitic resistor 526 is 2.5 mohm and the ideal reference voltage is 0.6V. Curve 602 shows load regulation of the converter system 500 having an input voltage being 6.5V and an output voltage being 5V; Curve 604 shows load regulation of the converter system 500 having an input voltage being 12V and an output voltage being 5V; Curve 606 shows load regulation of the converter system 500 having an input voltage being 12V and an output voltage being 3.3V; and Curve 608 shows load regulation of the converter system 500 having an input voltage being 12V and an output voltage being 0.6V.

According to equation (2), also as shown in FIG. 6, load regulation of the converter system 500 gets worse with a smaller duty cycle, a lower reference voltage, or a larger maximum output current. However, higher output current with lower output voltage is a trend in digital core supply, and duty cycle is determined based on input and output voltages of the converter system 500.

Figure 7:
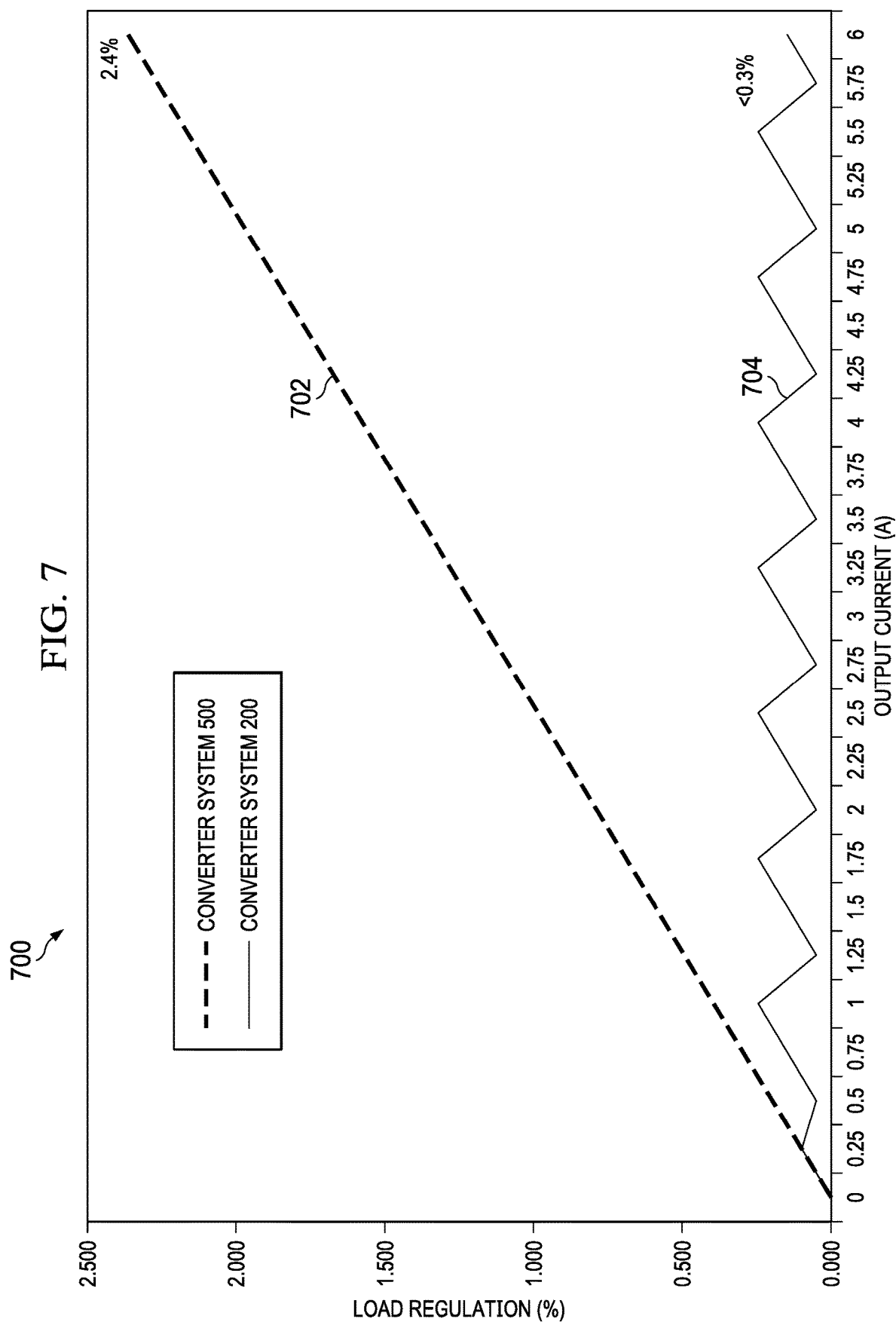
FIG. 7 is a graph of load regulations of the voltage converter system of FIG. 2 compared to the voltage converter system of FIG. 5.

FIG. 7 is a graph of load regulations of the voltage converter system 200 of FIG. 2 compared to the voltage converter system 500 of FIG. 5 under the condition that the resistance $R_{par}$ of the ground pin parasitic resistor 226/526 is 2.5 mohm, the ideal reference voltage is 0.6V, the maximum output current Iout_max is 6A, the input voltage is 12V, the output voltage is 0.6V, and the number of bits of the current and voltage DACs of the voltage converter system 200 of FIG. 2 is 3. As shown in FIG. 7, compared with the load regulation curve 702 of the converter system 500 of FIG. 5, the load regulation curve 704 of the converter system 200 of FIG. 2 is divided into 8 sections by 3-bit DACs, and load regulation is reduced from 2.4% to 0.3% when the output current is 6A.

Figure 8:
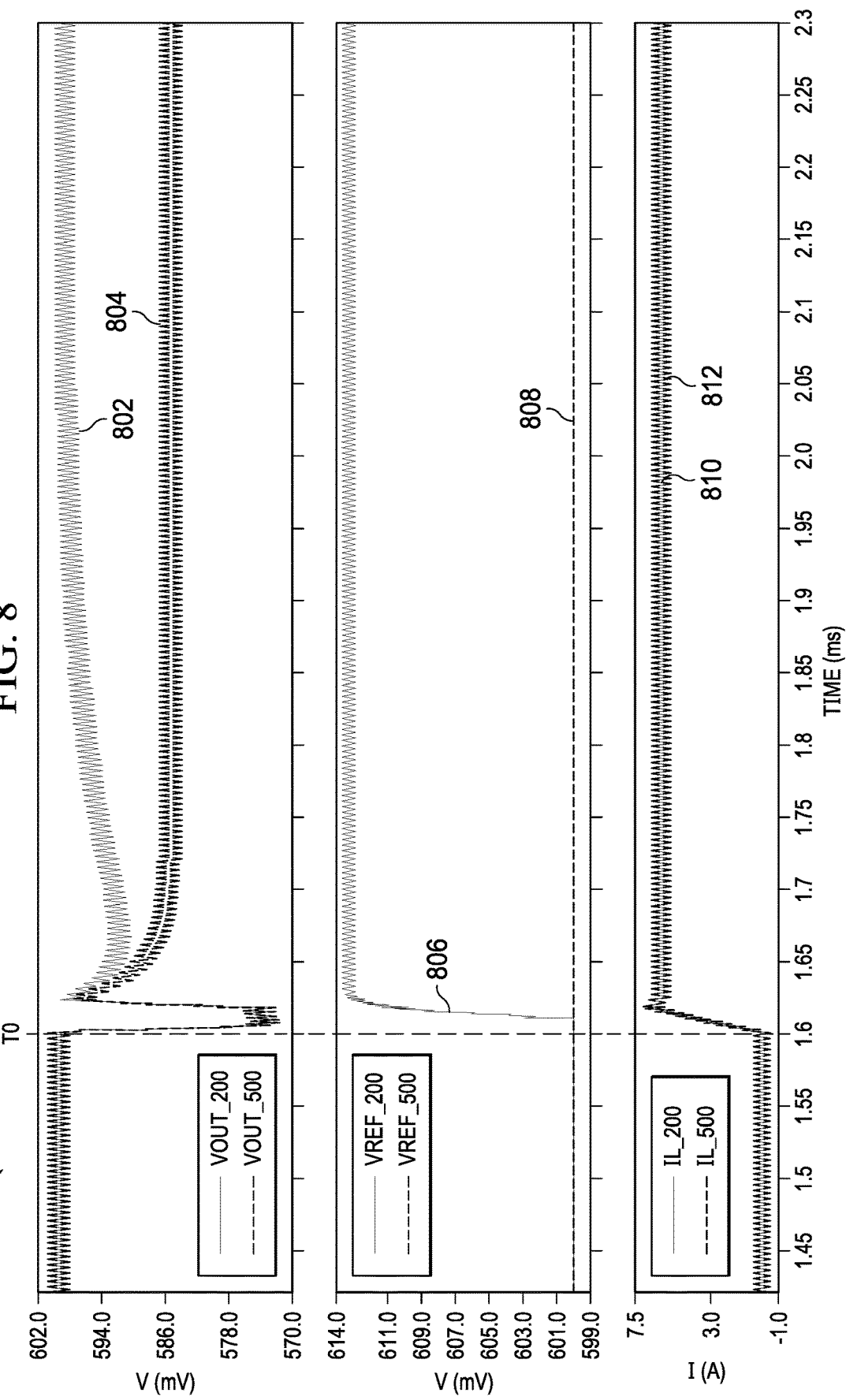
FIG. 8 is a timing diagram of simulation waveforms of the voltage converter of FIG. 2 and the voltage converter system of FIG. 5.

FIG. 8 is a timing diagram 800 of simulation waveforms of the voltage converter system 200 of FIG. 2 and the voltage converter system 500 of FIG. 5, under simulation conditions of: VIN=12V; target VOUT=0.6V; ideal VREF=0.6V; $R_{par}$=2.5 mohm; and output current Iout increasing from 0A to 6A. Waveform 802 is output voltage VOUT_200 of the voltage converter system 200 of FIG. 2, and waveform 804 is output voltage VOUT_500 of the voltage converter system 500 of FIG. 5. Waveform 806 is the reference voltage VREF_200 provided to the amplifier 218 of the voltage converter system 200 of FIG. 2, waveform 808 is the reference voltage VREF_500 provided to the amplifier 518 of the voltage converter system 500 of FIG. 5, and the reference voltages VREF_200 and VREF_500 are relative to the power ground PGND. Waveform 810 is inductor current IL_200 of the voltage converter system 200 of FIG. 2, and waveform 812 is inductor current IL_500 of the voltage converter system 500 of FIG. 5. The waveforms 810 and 812 are shown as overlapped in FIG. 8.

At time T0, the second switches 204 and 504 are switched on, which causes an increase of the inductor currents IL_200 810 and IL_500 812, and a drop of the output voltages VOUT_200 802 and VOUT_500 804. Responsive to the second switch 204 being switched on, the reference voltage VREF_200 806 of the voltage converter system 200 of FIG. 2 increases with reference to the power ground PGND based on a sensed voltage drop at the power ground terminal PGND. Compensation to the reference voltage VREF_200 806 causes the output voltage VOUT_200 of the voltage converter system 200 of FIG. 2 to recover substantially to the target output voltage 600 mV. However, the reference voltage VREF_500 808 of the voltage converter system 500 of FIG. 5 remains at 0.6V with reference to the power ground PGND. Because of a 15 mV voltage drop across the ground pin parasitic resistor 526, the output voltage VOUT_500 804 of the voltage converter system 500 of FIG. 5 recovers to and remains at 585 mV when the second switch 504 is on.

In this description, the term "couple" may cover connections, communications, or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C, if intervening component C does not alter the functional relationship between device A and device B, such that device B is controlled by device A via the control signal generated by device A.

Modifications are possible in the described examples, and other examples are possible, within the scope of the claims.

What is claimed is:

1. A voltage converter system, comprising:
a switch having first and second switch terminals and a switch control terminal, wherein the first switch terminal is coupled to a switching terminal, the second switch terminal is coupled to a voltage supply terminal, and the switch is configured to operate in a first state or a second state;
compensation circuitry configured to provide a reference voltage, wherein the reference voltage is a first reference voltage responsive to the switch operating in the second state, and the reference voltage is a second reference voltage responsive to the switch operating in the first state;
control circuitry coupled between the switch and the compensation circuitry, and configured to control the switch responsive to the reference voltage and a feedback voltage at a feedback voltage terminal, the feedback voltage being proportional to an output voltage; and
sensing circuitry coupled to the switch, the sensing circuitry including:
a first sensing transistor coupled to the switching terminal, and having a first sensing control terminal;
a second sensing transistor coupled in series with the first sensing transistor and having a second sensing control terminal, the second sensing control terminal coupled to the switch control terminal;
a comparator having first and second comparator inputs, wherein the first comparator input is coupled to the second sensing transistor, and the second comparator input is coupled to the second switch terminal;
an up/down counter having a counter output, and configured to provide a sensed signal at the counter output responsive to a difference between a sensed voltage at the second sensing transistor and a voltage at the second switch terminal; and
a variable current source coupled between the counter output and the sensing transistors, and configured to provide a sensed current to the sensing transistors responsive to the sensed signal.

2. The voltage converter system of claim 1, further comprising a voltage source coupled between the compensation circuitry and the voltage supply terminal, the voltage source configured to provide the first reference voltage responsive to a bandgap voltage.

3. The voltage converter system of claim 2, wherein the compensation circuitry includes:
sensing circuitry coupled to the switch, and configured to provide the sensed signal at the counter output, wherein the sensed signal is proportional to a current flowing through the switch if the switch is operating in the first state; and
reference voltage generation circuitry coupled to the sensing circuitry and the voltage source, and configured to:
provide the first reference voltage responsive to the switch operating in the second state; and
provide the second reference voltage responsive to the first reference voltage and the sensed signal.

4. The voltage converter system of claim 3, wherein the reference voltage generation circuitry includes:
a multiplexer having a multiplexer output and first and second multiplexer inputs, wherein the first multiplexer input is configured to receive a binary signal, the second multiplexer input is coupled to the counter output, and the multiplexer is configured to: provide the binary signal responsive to the switch operating in the second state; and provide the count value responsive to the switch operating in the first state; and
a voltage DAC having a voltage DAC input and a voltage DAC output, wherein the voltage DAC input is coupled to the multiplexer output, and the voltage DAC is configured to provide the reference voltage at the voltage DAC output responsive to the multiplexer output.

5. The voltage converter system of claim 4, wherein the voltage DAC includes:
a decoder configured to convert the multiplexer output to a one-hot signal;
a resistor ladder including resistors coupled in series, the resistors including a first resistor coupled between the voltage source and the voltage supply terminal; and
voltage control switches, each voltage control switch including: a respective first terminal coupled to a respective tap between each two adjacent resistors of the resistor ladder, and a respective second terminal coupled to the voltage DAC output, and controlled by a respective bit of the one-hot signal,
in which the decoder is configured to convert the binary signal to a first one-hot signal to switch on a first voltage control switch coupled to a tap between the first resistor and a second resistor, and to convert the count value to a second one-hot signal to switch on a voltage control switch based on the count value.

6. The voltage converter system of 9, wherein the control circuitry includes:
an amplifier having an amplifier output and first and second amplifier inputs, wherein the first amplifier input is coupled to the feedback voltage terminal, the second amplifier input is coupled to the voltage DAC output, and the amplifier is configured to provide an amplifier output signal at the amplifier output responsive to the feedback voltage and the reference voltage; and
control and logic circuitry coupled to the amplifier output and configured to provide a switch control signal responsive to the amplifier output signal.

7. The voltage converter system of claim 1, wherein the sensed signal is a count value provided at the counter output, and the up/down counter is configured to:
count up responsive to the switch operating in the first state and the voltage at the second switch terminal being higher than the sensed voltage, and count down responsive to the switch operating in the first state and the voltage at the second switch terminal being lower than the sensed voltage; and
latch the count value responsive to the switch switching from the first state to the second state.

8. The voltage converter system of claim 7, wherein the variable current source is a current digital-to-analog converter (DAC) configured to convert the count value to the sensed current, and to inject the sensed current to the first and second sensing transistors, the current DAC comprising parallel current paths, each current path including a respective current source and a respective current control switch configured to couple the respective current source to the first and second sensing transistors, respectively, in which the current control switch of each respective current path is controlled by a respective bit of the count value.

9. The voltage converter system of claim 1, wherein the comparator is a hysteretic comparator.

10. A controller for a voltage converter system, the controller comprising:
a switch having a switch control terminal and first and second switch terminals, wherein the first switch terminal is coupled to a converter switching terminal, the switch being configured to operate in a first state or a second state;
compensation circuitry configured to provide a first reference voltage at a reference voltage terminal responsive to the switch operating in the second state, and a second reference voltage at the reference voltage terminal responsive to the switch operating in the first state; and
control circuitry coupled between the switch and the compensation circuitry, and configured to control the switch responsive to the reference voltage and a feedback voltage at a feedback voltage terminal, the feedback voltage being proportional to an output voltage; and
sensing circuitry coupled to the switch, the sensing circuitry including:
a first sensing transistor coupled to the switching terminal, and having a first sensing control terminal;
a second sensing transistor coupled in series with the first sensing transistor and having a second sensing control terminal, the second sensing control terminal coupled to the switch control terminal;
a comparator having first and second comparator inputs, wherein the first comparator input is coupled to the second sensing transistor, and the second comparator input is coupled to the second switch terminal;
an up/down counter having a counter output, and configured to provide a sensed signal at the counter output responsive to a difference between a sensed voltage at the second sensing transistor and a voltage at the second switch terminal; and
a variable current source coupled between the counter output and the sensing transistors, and configured to provide a sensed current to the sensing transistors responsive to the sensed signal.

11. The controller of claim 10, further comprising:
a voltage source coupled between the compensation circuitry and the voltage supply terminal, the voltage source configured to provide the first reference voltage responsive to a bandgap voltage.

12. The controller of claim 11, wherein the compensation circuitry includes:
sensing circuitry coupled to the switch, and configured to provide the sensed signal at the counter output, wherein the sensed signal is proportional to a current flowing through the switch if the switch is operating in the first state; and
reference voltage generation circuitry coupled to the sensing circuitry and the voltage source, and configured to:
provide the first reference voltage responsive to the switch operating in the second state; and
provide the second reference voltage responsive to the first reference voltage and the sensed signal.

13. The controller of claim 12, wherein the reference voltage generation circuitry includes:
a multiplexer having a multiplexer output and first and second multiplexer inputs, wherein the first multiplexer input is configured to receive a binary signal, the second multiplexer input is coupled to the counter output, and the multiplexer is configured to: provide the binary signal responsive to the switch operating in the second state; and provide the count value responsive to the switch operating in the first state; and
a voltage DAC having a voltage DAC input and a voltage DAC output, wherein the voltage DAC input is coupled to the multiplexer output, and the voltage DAC is configured to provide the reference voltage at the voltage DAC output responsive to the multiplexer output.

14. The controller of claim 13, wherein the voltage DAC includes:
a decoder configured to convert the multiplexer output to a one-hot signal;
a resistor ladder including resistors coupled in series, the resistors including a first resistor coupled between the voltage source and the voltage supply terminal; and
voltage control switches, each voltage control switch including: a respective first terminal coupled to a respective tap between each two adjacent resistors of the resistor ladder, and a respective second terminal coupled to the voltage DAC output, and controlled by a respective bit of the one-hot signal,
in which the decoder is configured to convert the binary signal to a first one-hot signal to switch on a first voltage control switch coupled to a tap between the first resistor and a second resistor, and to convert the count value to a second one-hot signal to switch on a voltage control switch based on the count value.

15. The controller of claim 14, wherein the control circuitry includes:
an amplifier having an amplifier output and first and second amplifier inputs, wherein the first amplifier input is coupled to the feedback voltage terminal, the second amplifier input is coupled to the voltage DAC output, and the amplifier is configured to provide an amplifier output signal at the amplifier output responsive to the feedback voltage and the reference voltage; and
control and logic circuitry coupled to the amplifier output and configured to provide a switch control signal responsive to the amplifier output signal.

16. The controller of claim 10, wherein the sensed signal is a count value provided at the counter output, and the up/down counter is configured to:
count up responsive to the switch operating in the first state and the voltage at the second switch terminal being higher than the sensed voltage, and count down responsive to the switch operating in the first state and the voltage at the second switch terminal being lower than the sensed voltage; and
latch the count value responsive to the switch switching from the first state to the second state.

17. The controller of claim 10, wherein the comparator is a hysteretic comparator.

18. The controller of claim 16, wherein the variable current source is a current digital-to-analog converter (DAC) configured to convert the count value to the sensed current, and to inject the sensed current to the first and second sensing transistors, the current DAC comprising parallel current paths, each current path including a respective current source and a respective current control switch configured to couple the respective current source to the first and second sensing transistors, respectively, in which the current control switch of each respective current path is controlled by a respective bit of the count value.

* * * * *